(12) United States Patent
Kim et al.

(10) Patent No.: US 12,550,082 B2
(45) Date of Patent: Feb. 10, 2026

(54) METHOD AND APPARATUS FOR MITIGATING INTERFERENCE IN A WIRELESS COMMUNICATION SYSTEM

(71) Applicant: ELECTRONICS AND TELECOMMUNICATIONS RESEARCH INSTITUTE, Daejeon (KR)

(72) Inventors: Jun Hyeong Kim, Daejeon (KR); Go San Noh, Daejeon (KR); Il Gyu Kim, Daejeon (KR); Man Ho Park, Daejeon (KR); Nak Woon Sung, Daejeon (KR); Jae Su Song, Daejeon (KR); Nam Suk Lee, Daejeon (KR); Hee Sang Chung, Daejeon (KR); Min Suk Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 532 days.

(21) Appl. No.: 17/986,110

(22) Filed: Nov. 14, 2022

(65) Prior Publication Data

US 2023/0156634 A1   May 18, 2023

(30) Foreign Application Priority Data

Nov. 15, 2021 (KR) .................. 10-2021-0156802
Nov. 14, 2022 (KR) .................. 10-2022-0151488

(51) Int. Cl.
*H04W 56/00* (2009.01)
*H04B 7/06* (2006.01)
(Continued)

(52) U.S. Cl.
CPC ...... *H04W 56/0005* (2013.01); *H04B 7/0617* (2013.01); *H04W 56/0045* (2013.01); *H04W 64/003* (2013.01); *H04W 72/20* (2023.01)

(58) Field of Classification Search
CPC ......... H04W 56/0005; H04W 56/0045; H04W 64/003; H04W 72/20; H04W 56/00; H04W 56/001; H04W 56/0015; H04B 7/0617
See application file for complete search history.

(56) References Cited

U.S. PATENT DOCUMENTS 8,068,785 B2    11/2011   Ahn et al.
8,582,513 B2    11/2013   Park et al.
(Continued)

FOREIGN PATENT DOCUMENTS

KR       10-1532436 B1     7/2015

OTHER PUBLICATIONS

Junhyeong Kim et al., "A Study on Frequency Planning of MN System for 5G Vehicular Communications", ICTC 2019.

*Primary Examiner* — Anh H Ly
*Assistant Examiner* — Ayodele Lawrence Olubodun
(74) *Attorney, Agent, or Firm* — LRK PATENT LAW FIRM

(57) ABSTRACT

A communication method of a base station may include: configuring a first band as a communication band from an entire carrier frequency band of the base station, the entire carrier frequency band including the first band and a second band; transmitting a synchronization signal in the first band by beamforming in one of both directions of a moving path of a transportation means; communicating with a terminal by beamforming in a same direction as the synchronization signal in the first band; and transmitting a synchronization (Continued)

signal in the second band by beamforming in the same direction as the synchronization signal in the first band.

20 Claims, 9 Drawing Sheets

(51) Int. Cl.
*H04W 64/00* (2009.01)
*H04W 72/20* (2023.01)

(56) References Cited

U.S. PATENT DOCUMENTS

| | | | |
|---|---|---|---|
| 8,805,429 B2 | 8/2014 | Cho et al. | |
| 9,049,714 B2 | 6/2015 | Ji et al. | |
| 9,876,589 B2 | 1/2018 | Hahn et al. | |
| 10,756,786 B1* | 8/2020 | Ben-Shlomo | H04B 7/0413 |
| 10,880,030 B2 | 12/2020 | Park et al. | |
| 2012/0120998 A1* | 5/2012 | Fakhrai | H04L 1/0015 |
| | | | 375/224 |
| 2014/0044108 A1* | 2/2014 | Earnshaw | G01S 5/0063 |
| | | | 370/336 |
| 2018/0006702 A1* | 1/2018 | Doostnejad | H04B 7/088 |
| 2018/0035396 A1* | 2/2018 | Stirling-Gallacher | |
| | | | H04H 20/16 |
| 2018/0288823 A1* | 10/2018 | Hampel | H04L 45/74 |
| 2020/0252891 A1* | 8/2020 | Chendamarai Kannan | |
| | | | H04B 7/088 |
| 2021/0051658 A1* | 2/2021 | Park | H04W 56/001 |
| 2021/0258979 A1 | 8/2021 | Bai et al. | |
| 2021/0281454 A1* | 9/2021 | Yang | H04L 5/0094 |
| 2022/0182130 A1* | 6/2022 | Abedini | H04W 76/15 |
| 2023/0036652 A1* | 2/2023 | Damnjanovic | H04L 5/0032 |
| 2023/0105291 A1* | 4/2023 | Abedini | H04W 74/0833 |
| | | | 370/329 |
| 2024/0080075 A1* | 3/2024 | Lee | H04B 7/08 |

* cited by examiner

METHOD AND APPARATUS FOR MITIGATING INTERFERENCE IN A WIRELESS COMMUNICATION SYSTEM

CROSS-REFERENCE TO RELATED APPLICATIONS

This application claims priority to Korean Patent Applications No. 10-2021-0156802, filed on Nov. 15, 2021, and No. 10-2022-0151488, filed on Nov. 14, 2022, with the Korean Intellectual Property Office (KIPO), the entire contents of which are hereby incorporated by reference.

BACKGROUND

1. Technical Field

Exemplary embodiments of the present disclosure relate to interference mitigation techniques in a wireless communication system, and more specifically, to interference mitigation techniques in a wireless communication system using a beamforming scheme.

2. Description of Related Art

As wireless communication technology develops, methods of using the mobile Internet based on wireless communication technology are being widely used. The mobile Internet technology refers to a technology in which a mobile user using a wireless communication system accesses the Internet through the wireless communication system.

Most cases of using the mobile Internet may be cases of accessing the Internet through a wireless communication system while riding in a transportation means. In a mobile communication system for providing high-speed Internet services to users in a public transportation vehicle in which a large number of users ride, the services may be provided in a different form from the general wireless communication scheme. For example, a vehicle terminal installed outside the vehicle may communicate with a base station through a mobile wireless backhaul. In addition, the vehicle terminal installed outside the vehicle may perform a role of relaying data to in-vehicle user terminals through an in-vehicle network.

The-above described scheme has an advantage of overcoming a propagation loss that occurs when a radio wave received from the outside of the vehicle passes through an outer wall of the vehicle. In addition, since the vehicle terminals perform a group handover at a cell boundary, it is possible to reduce signaling overhead caused by the in-vehicle user terminals independently performing a handover. In addition, in the case of vehicle terminals, unlike general user terminals, implementation thereof is relatively easy because there are no major restrictions on implementation (e.g., hardware miniaturization, etc.). Further, the in-vehicle user terminals have an advantage of not requiring additional upgrades because they can be serviced using a commercialized technology such as Wi-Fi.

Currently, various wireless communication systems, including cellular mobile communication systems, have introduced beamforming technology to improve link performance. In particular, research and development on a wireless communication system that utilizes a high-frequency band capable of utilizing a wide bandwidth such as millimeter wave for a mobile wireless backhaul link is being actively conducted in order to provide high-speed Internet services to public transportation with a large number of users as described above.

In such the system, beamforming technology is applied to vehicle terminals and base stations to compensate for a short coverage, which is a disadvantage of the high-frequency band. In the 3GPP, a high-speed train communication scenario in a 30 GHz band was included as one of the deployment scenarios of 5G New Radio (NR), and in the Vehicle-to-Everything (V2X) standardization meeting of the future releases, it is expected that a high-frequency band such as the 30 GHz band will be discussed.

SUMMARY

Exemplary embodiments of the present disclosure are directed to providing a frequency resource allocation method for mitigating interferences between base stations.

Exemplary embodiments of the present disclosure are also directed to providing operational procedures between a base station and a terminal to mitigate interferences between base stations.

According to a first exemplary embodiment of the present disclosure, a communication method of a base station may comprise: configuring a first band as a communication band from an entire carrier frequency band of the base station, the entire carrier frequency band including the first band and a second band; transmitting a synchronization signal in the first band by beamforming in one of both directions of a moving path of a transportation means; communicating with a terminal by beamforming in a same direction as the synchronization signal in the first band; and transmitting a synchronization signal in the second band by beamforming in the same direction as the synchronization signal in the first band.

The communication method may further comprise: when at least part of frequency resources of the communication band are not used for communication, generating a resource use permission message for notifying an adjacent base station; and transmitting the resource use permission message to the adjacent base station.

The communication method may further comprise: when resource use permission messages for the second band are received from two or more adjacent base stations, communicating with the terminal using resources of the second band indicated by the resource use permission messages.

Each of the resource use permission messages may include an indication for permitting use of a specific frequency resource for the second band, information indicating a start time at which the specific frequency resource is available, and information indicating available slot(s) based on the start time.

When communicating with the terminal using the resources of the second band, the base station may use only common resources among resources permitted by the resource use permission messages received from the adjacent base stations.

The communication method may further comprise: obtaining information on a distance between the base station and each of terminals communicating in the first band; transmitting a control message indicating to switch a communication band to the second band to a terminal located within a preset threshold distance from the base station; and communicating with the terminal located within the preset threshold distance from the base station in the second band.

In the obtaining of the information on the distance, a timing advance (TA) value based on a signal received from each of the terminals may be used.

The obtaining of the information on the distance may comprise: transmitting a first message requesting location information to each of the terminals; receiving a second message including the location information from each of the terminals; and calculating the distance using a location of the base station and the location information of each of the terminals.

The synchronization signal transmitted in the first band and the synchronization signal transmitted in the second band may be configured as distinguishable signals from each other.

According to a second exemplary embodiment of the present disclosure, a base station may comprise: a processor; and a transceiver for communicating with at least one terminal, wherein the processor is executed to perform: configuring a first band as a communication band from an entire carrier frequency band of the base station, the entire carrier frequency band including the first band and a second band; controlling the transceiver to transmit a synchronization signal in the first band by beamforming in one of both directions of a moving path of a transportation means; controlling the transceiver to communicate with a terminal by beamforming in a same direction as the synchronization signal in the first band; and controlling the transceiver to transmit a synchronization signal in the second band by beamforming in the same direction as the synchronization signal in the first band.

The processor may be further executed to perform: when at least part of frequency resources of the communication band are not used for communication, generating a resource use permission message for notifying an adjacent base station; and controlling the transceiver to transmit the resource use permission message to the adjacent base station.

The processor may be further executed to perform: when resource use permission messages for the second band are received from two or more adjacent base stations, controlling the transceiver to communicate with the terminal using resources of the second band indicated by the resource use permission messages.

Each of the resource use permission messages may include an indication for permitting use of a specific frequency resource for the second band, information indicating a start time at which the specific frequency resource is available, and information indicating available slot(s) based on the start time.

The processor may be further executed to perform: when communicating with the terminal using the resources of the second band, using only common resources among resources permitted by the resource use permission messages received from the adjacent base stations.

The processor may be further executed to perform: obtaining information on a distance between the base station and each of terminals communicating in the first band; controlling the transceiver to transmit a control message indicating to switch a communication band to the second band to a terminal located within a preset threshold distance from the base station; and controlling the transceiver to communicate with the terminal located within the preset threshold distance from the base station in the second band.

In the obtaining of the information on the distance, a timing advance (TA) value based on a signal received from each of the terminals may be used.

In the obtaining of the information on the distance, the processor may be further executed to perform: controlling the transceiver to transmit a first message requesting location information to each of the terminals; controlling the transceiver to receive a second message including the location information from each of the terminals; and calculating the distance using a location of the base station and the location information of each of the terminals.

The synchronization signal transmitted in the first band and the synchronization signal transmitted in the second band may be configured as distinguishable signals from each other.

According to a third exemplary embodiment of the present disclosure, a communication method of a base station may comprise: determining a communication band to be used for communication based on a frequency division scheme, for each remote unit (RU) belonging to a plurality of RU pairs arranged along a moving path of a transportation means; and communicating, by RUs constituting each of the plurality of RU pairs, with a terminal by respectively beamforming in different directions on the moving path in the determined communication band, wherein the frequency division scheme comprises: configuring a first band as a communication band for a first RU among odd-numbered RUs constituting the plurality of RU pairs; configuring one of the first band and a second band as a communication band for each RU so that adjacent RUs among the odd-numbered RUs have different communication bands; and configuring one of the first band and the second band as a communication band for each RU forming a pair with each of the odd-numbered RUs so that the each RU forming the pair with each of the odd-numbered RUs has a band different from a band of the each of the odd-numbered RUs.

RUs forming each of the plurality of RU pairs may be installed in a same geographical location.

According to the present disclosure, inter-cell interference can be alleviated by differently configuring frequency resources used for each base station in a beamforming-based vehicle communication system environment. In addition, there is an advantage in that a transmission rate can be improved by allocating an additional band within a time period allowed by an adjacent base station. In addition, it is possible to provide an operation method for allowing a terminal that can use only one partial band at a time to smoothly perform adjacent cell search.

DETAILED DESCRIPTION OF THE EMBODIMENTS

Figure 1:
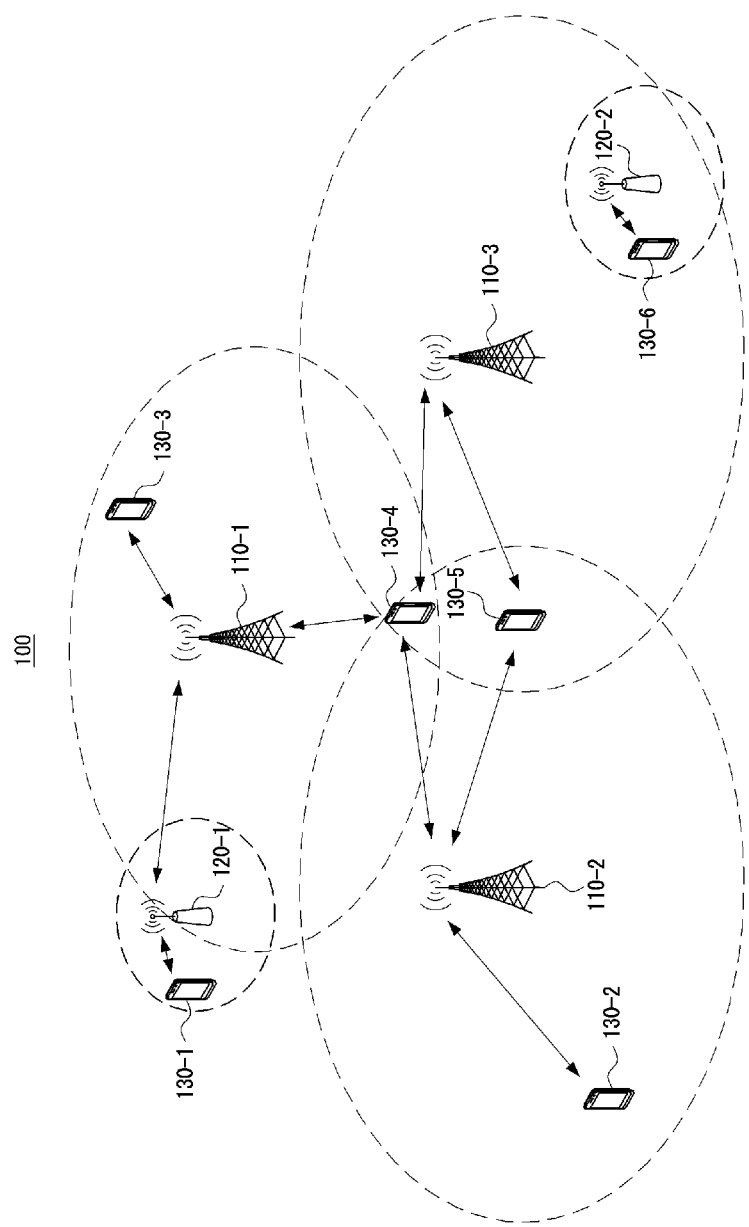
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSDPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
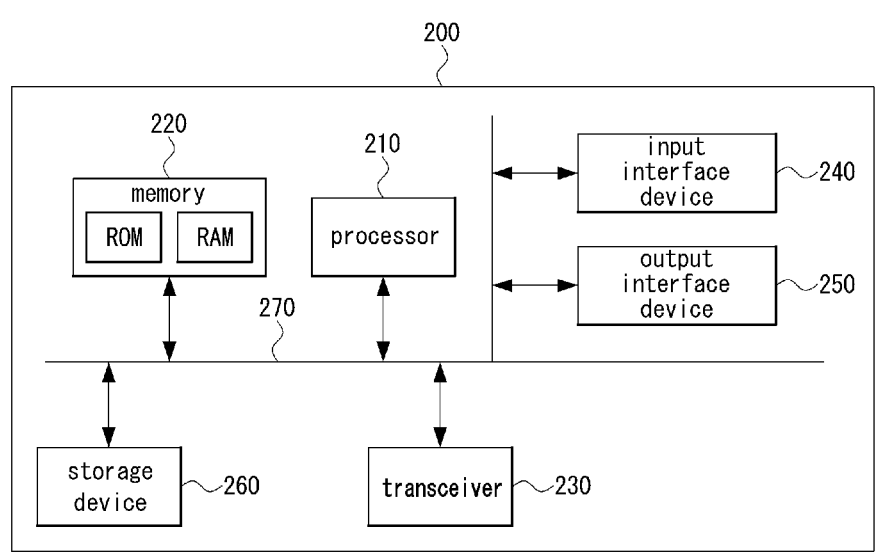
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, a method and an apparatus for mitigating interference between base stations in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g., remote radio transmission/reception function, baseband processing function, and the like) of a communication protocol. Alternatively, the remote radio transmission/reception function among all the functions of the communication protocol may be performed by a transmission reception point (TRP) (e.g., flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

Figure 3:
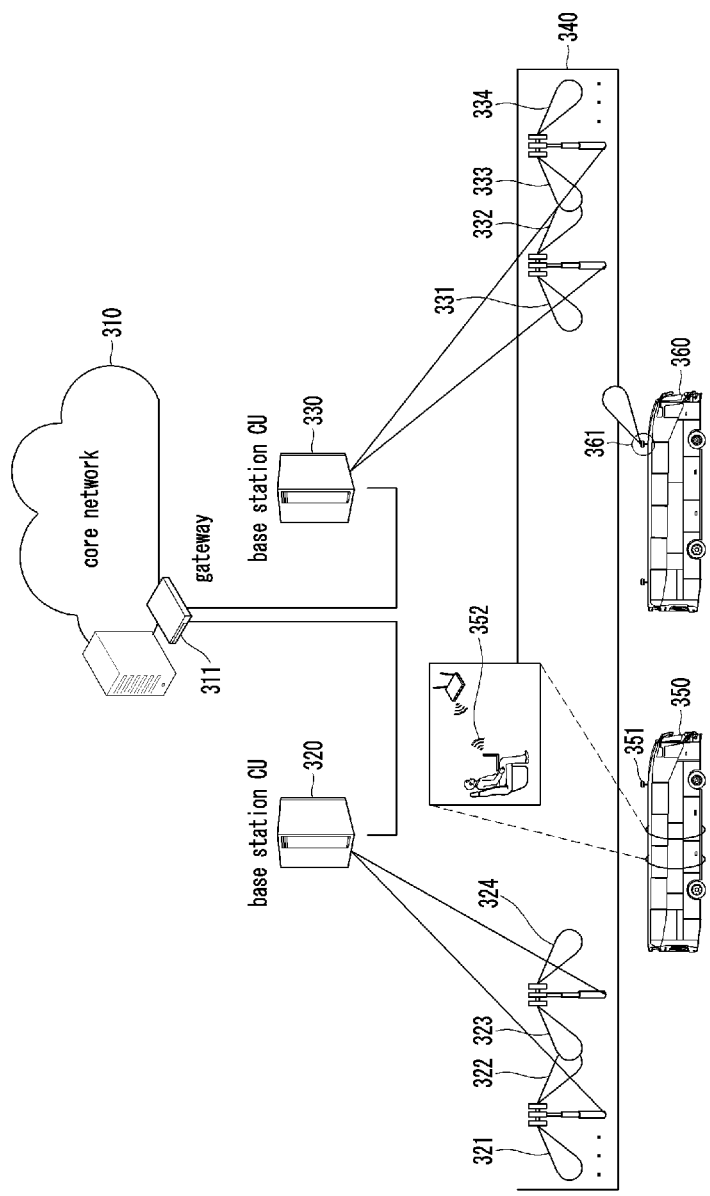
FIG. 3 is a conceptual diagram for describing an operation of a millimeter wave band vehicle wireless communication network.

FIG. 3 is a conceptual diagram for describing an operation of a millimeter wave band vehicle wireless communication network.

Referring to FIG. 3, a form in which a core network 310 includes public Internet is exemplified. A gateway 311, which is a termination entity of the core network 310, may be connected to a wireless communication network. Specifically, the gateway 311 may be connected to a base station directly or through a user plane function (UPF) of a mobile communication network.

Each of base stations illustrated in FIG. 3 exemplifies a form composed of one centralized unit (CU) and a plurality of distributed units (DUs). In this manner, splitting one base station into a CU and a plurality of DUs may be a form according to an implementation scheme of an Open Radio Access Network (O-RAN).

The gateway 311 may be connected to CUs 320 and 330 directly or through the UPF. In the following description, the first CU 320 and the second CU 330 will be described with distinction. A plurality of DUs 321, 322, 323, and 324 may be connected below the first CU 320, and a plurality of DUs 331, 332, 333, and 334 may be connected below the second CU 330. Since each of the plurality of DUs 321, 322, 323, 324, 331, 332, 333, and 334 can perform beamforming, each of the plurality of DUs 321, 322, 323, 324, 331, 332, 333, and 334 is illustrated in form of a beam in FIG. 3.

Public transportation vehicles 350 and 360 such as bus or train may be respectively equipped with vehicle terminals 351 and 361 according to the present disclosure. Although buses are exemplified in FIG. 3, the present disclosure is not limited thereto, and exemplary embodiments of the present disclosure may be applied to various types of public transportation means such as train or subway.

A passenger (or user) riding in the public transportation vehicle 350 may communicate using a wireless communication terminal 352. In this case, the wireless communication terminal 352 may be directly connected to a specific wireless communication network to perform communication, or may communicate through the vehicle terminal 351. For example, the vehicle terminal 351 may access a specific DU through a wireless channel, and may be connected to the core network 310 through a CU. In addition, the vehicle terminal 351 may allow the wireless communication terminal 352 of the user riding in the public transportation vehicle 350 to access the vehicle terminal 351 through a band such as Wi-Fi band.

Each of the plurality of DUs 321, 322, 323, 324, 331, 332, 333, and 334 illustrated in FIG. 3 may communicate with the vehicle terminals 351 and 361 in a beamforming scheme in a wireless communication network. In particular, when the plurality of DUs 321, 322, 323, 324, 331, 332, 333, and 334 use a high-frequency band such as a millimeter wave band, the beamforming scheme may be suitable for compensating for a high path loss. As such, when the plurality of DUs 321, 322, 323, 324, 331, 332, 333, and 334 perform beamforming, the vehicle terminals 351 and 361 may also perform reception beamforming.

Meanwhile, the public transportation vehicle 350 moves along a road 340. The train which is another example of the public transportation means may be characterized by moving along a fixed track. Therefore, when installing the plurality of DUs 321, 322, 323, 324, 331, 332, 333, and 334 for public transportation vehicles, characteristics of the beamforming and characteristics of moving along a fixed road or track may be utilized. That is, when deploying the plurality of DUs 321, 322, 323, 324, 331, 332, 333, and 334, two independent cells may be formed by installing two DUs forming beams in both directions of the road at the same location.

More specifically, the DUs 321 and 322 connected below the first CU 320 may be installed at the same location and implemented as independent cells forming beams in different directions of the road. In the same manner, the DUs 323 and 324 connected below the first CU 320 may also be installed at the same location, and may be implemented as independent cells forming beams in different directions of the road. Also, as illustrated in FIG. 3, the location of the DUs 321 and 322 and the location of the DUs 323 and 324 may be adjacent to each other. The DUs 331, 332, 333, and 334 connected below the second CU 330 may be arranged in the same manner as the DUs 321, 322, 323, and 324 connected below the first CU 320.

In the present disclosure, communication between a base station and a communication device moving together with a transportation means will be described. In the present disclosure described below, for convenience of description, a vehicle such as a bus will be used as an example of the transportation means.

Figure 4:
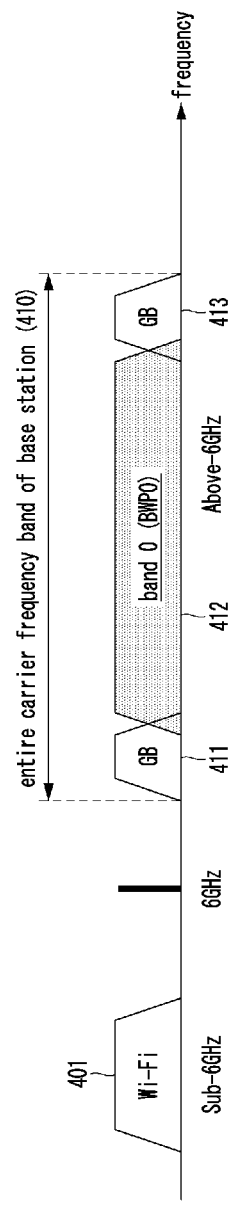
FIG. 4 is an exemplary diagram for describing a frequency band used for communication of public transportation means.

FIG. 4 is an exemplary diagram for describing a frequency band used for communication of public transportation means.

Referring to FIG. 4, a Wi-Fi band 401 used for short-range wireless communication is exemplified. In the Wi-Fi band 401, data may be transmitted and received through a frequency band below 6 GHz as illustrated in FIG. 4. In addition, a DU (or base station) communicating with a vehicle terminal may communicate using a band higher than 6 GHz, for example, 30 GHz. That is, communication between the vehicle terminal mounted on (or attached to) a public transportation vehicle and a base station may be performed in a band higher than 6 GHz. Therefore, the vehicle terminal may communicate with the DU through the band higher than 6 GHz, and may communicate with the wireless communication terminal 352 of the user riding in the vehicle in the Wi-Fi band 401 of 6 GHz or below.

The entire carrier frequency band 410 that can be used by the base station may be a band that each DU actually can use for communication. In addition, the entire carrier frequency band 410 of the base station may be composed of a band 0 (i.e., bandwidth part 0, BWP0) 412 that can be used for communication, a guard band (GB) 411 from the lowest frequency of the band 0 to a frequency higher by a certain value than the lowest frequency, and a GB 413 from the highest frequency of the band 0 to a frequency lower by a certain value than the highest frequency.

In addition, one DU may use the entire carrier frequency band 412 or only a part of the entire carrier frequency band 412 according to a frequency reuse factor of the communication system. In general, since more data can be transmitted as a communication bandwidth is wider in the wireless communication system, the same frequency band may be used by all base stations (i.e., all DUs) when the influence of inter-cell interference is not large. When all base stations use the same frequency band in this manner, the frequency reuse factor becomes 1.

Figure 5:
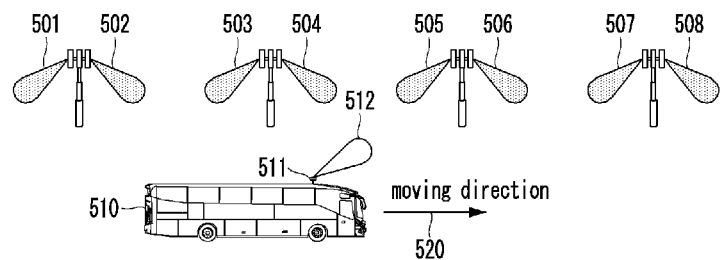
FIG. 5 is an exemplary diagram for describing communication between DUs and a vehicle terminal when a frequency reuse factor is 1.

FIG. 5 is an exemplary diagram for describing communication between DUs and a vehicle terminal when a frequency reuse factor is 1.

Referring to FIG. 5, DUs 501, 502, 503, 504, 505, 506, 507, and 508, a public transport vehicle 510, and a vehicle terminal 511 are illustrated. The configuration of FIG. 5 may be understood as a form extracting only a part of the configuration of FIG. 3. Accordingly, all of the DUs 501, 502, 503, 504, 505, 506, 507, and 508 may be connected to one CU, or may be connected to two or more different CUs. In the following description, for convenience of description, the DUs will be described so as to be identified as the first DU 501, second DU 502, third DU 503, fourth DU 504, fifth DU 505, sixth DU 506, seventh DU 507, and eighth DU 508, respectively. In addition, for convenience of description, the public transportation means may be assumed as a bus, and will be described as a vehicle.

In addition, since the vehicle 510 moves along a road, it may be assumed that the vehicle 510 generally moves in one direction. Therefore, in the following description, a moving direction 520 may be understood as a case in which the transportation means moves along the road or a track.

The first DU 501 and the second DU 502 may be installed at the same location and may form independent cells that perform beamforming in different directions with respect to the road. Also, the third DU 503 and the fourth DU 504 may be installed at the same location. In the same manner, the fifth DU 505 and the sixth DU 506 may be installed at the same location, and the seventh DU 507 and the eighth DU 508 may be installed at the same location. In addition, a beamforming direction of each may be a specific one direction as illustrated in the drawing.

Meanwhile, the first DU 501 and the second DU 502 installed at the same location may be modified in various forms in actual implementation. For example, a case in which a base station has a form of one CU and a plurality of DUs connected to the one CU may correspond to the above-described forms.

As another example, a form in which a base station has one CU and a plurality of DUs connected to the one CU, and includes a plurality of remote units (RUs) below one DU may be considered. In this case, the first DU 501 and the second DU 502 described above may each correspond to an RU. For example, referring to FIG. 3, a form in which two DUs are connected below the first CU 320 and two RUs are connected to each of the DUs may be considered. In this case, the beam 321 may have a form of being beamformed in one of the two RUs connected to the DU, and the beam 322 may have a form of being beamformed in the other RU connected to the DU. In this structure, one RU may be understood as one transmission and reception point (TRP).

As another example, a case in which one DU includes RU component(s) and has a plurality of antenna panels capable of performing beamforming may be considered. In this case, one DU including the RU component(s) may perform beamforming using some panel(s) of the plurality of antenna panels as shown by the reference numeral 321, and may perform beamforming using the remaining panel(s) of the plurality of antenna panels as shown by the reference numeral 322.

Each of the DUs or RUs described above may be implemented to perform beamforming in a different direction with respect to the road. That is, the DUs or RUs may be implemented to perform beamforming in the left and right directions with respect to the road 340, respectively, as illustrated in FIG. 3.

Although the description is made based on the DUs in the present disclosure, the exemplary embodiments of the present disclosure should be understood to include a case of beamforming in both directions of the road using RUs, TRPS, or a plurality of antenna panels as described above.

In addition, the vehicle terminal 511 according to the present disclosure may perform reception beamforming 512 in the moving direction 520 of the vehicle. As illustrated in FIG. 5, when the vehicle terminal 511 performs reception beamforming 512 in the specific direction, the vehicle terminal 511 may receive signals from a DU performing transmission beamforming in the direction of the vehicle terminal 511. Specifically, referring to FIG. 5, a case in which the fourth DU 504 and the fifth DU 505 perform beamforming in the direction of the vehicle terminal 511 is exemplified. In this case, since the vehicle terminal 512 performs reception beamforming in the moving direction 520, the vehicle terminal 512 may receive signals beamformed by the fifth DU 505. That is, since signals arriving at the rear of the vehicle terminal 511 may not correspond to the direction of reception beamforming of the vehicle terminal 511, the DU (e.g., the fourth DU 504) transmitting the corresponding signals may not be a serving base station of the vehicle terminal 511.

Meanwhile, in FIG. 5, all of the DUs 501, 502, 503, 504, 505, 506, 507, and 508 may use the same frequency band. That is, since a frequency reuse factor is 1, each of the DUs 501, 502, 503, 504, 505, 506, 507, and 508 may use the band 0 described with reference to FIG. 4.

Figure 6:
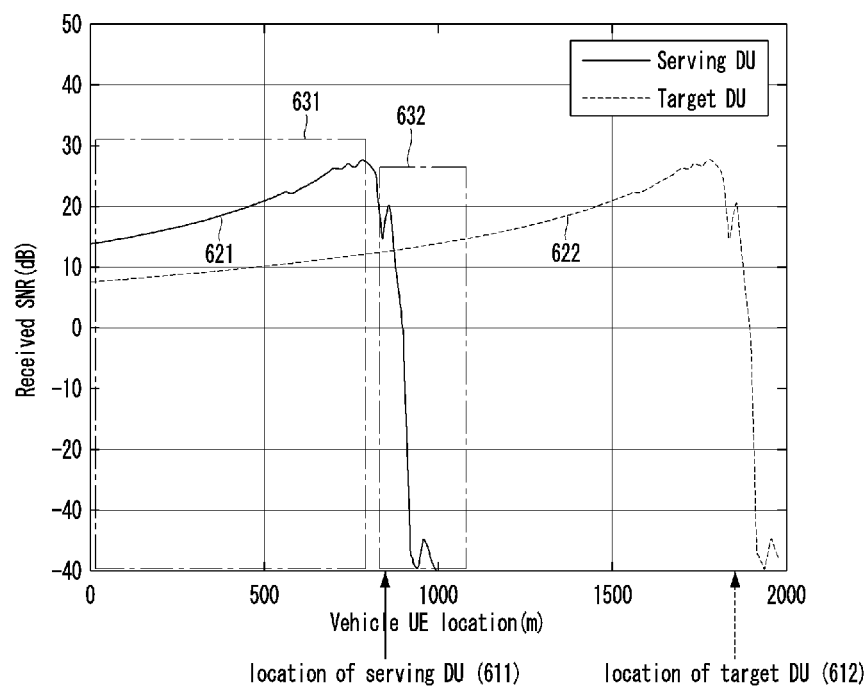
FIG. 6 is a simulation graph for describing interference between a serving base station and a target base station when a frequency reuse factor is 1.

FIG. 6 is a simulation graph for describing interference between a serving base station and a target base station when a frequency reuse factor is 1.

Referring to FIG. 6, a vertical axis represents a received signal-to-noise ratio (i.e., received SNR) of a signal received from the vehicle terminal, and a horizontal axis represents a distance (in meters) from the vehicle terminal to a DU that transmits the signal.

In FIG. 6, since the vehicle terminal moves along the road, and performs beamforming in the moving direction as described above, the vehicle terminal may receive signals form a serving DU that performs transmission beamforming in a direction opposite to the moving direction and a DU (i.e., target DU), among DUs adjacent to the serving DU, that performs transmission beamforming in a direction opposite to the moving direction. When describing this again with reference to FIG. 5, the serving DU for the vehicle terminal 511 may be the fifth DU 505, and the adjacent target DU may be the seventh DU 507.

Referring again to FIG. 6, a location 611 of the serving DU and a location 612 of the target DU, which communicate with the vehicle terminal, are exemplified. Referring to the horizontal axis of FIG. 6, distances of the serving DU and the target DU from the vehicle terminal may be identified. In the example of FIG. 6, it is assumed that the distance between the vehicle terminal and the serving DU is about 800 meters, and it is assumed that the distance between the vehicle terminal and the target DU is about 1800 meters.

Signal-to-noise ratios (SNRs) of the signals received from the serving DU and the target DU will be examined using the horizontal axis of FIG. 6. A reference numeral 621 denotes an SNR value of the signal received from the serving DU, and a reference numeral 622 denotes an SNR value of the signal received from the target DU. The current location of the vehicle terminal is a point '0' on the horizontal axis. It can be seen that the SNR value of the signal received from the serving DU increases as the vehicle terminal moves to the location 611 of the serving DU. In addition, it can be seen that as the vehicle terminal moves to the location 611 of the serving DU, the SNR value of the signal received from the target DU also increases.

Meanwhile, since the DUs perform communication in both directions of the road as described with reference to FIGS. 3 and 5, it can be seen that the signal from the serving DU is rapidly reduced when the vehicle terminal passes the location of the serving DU. More specifically, when the vehicle terminal passes the location of the serving DU, a strength of the signal received from the serving DU is rapidly reduced as in a period indicated by a reference numeral 632. This is because the DUs perform beamforming in specific directions as described above, and the vehicle terminal also performs reception beamforming in the moving direction. That is, when the vehicle terminal passes the direction in which the serving DU performs beamforming and moves in the opposite direction to the beamforming direction, the signal strength may be rapidly reduced as indicated by the reference numeral 632.

In addition, when a frequency reuse factor of 1 is used and beamforming is performed by installing the DUs as illustrated in FIGS. 3 and 5, inter-cell interference may be very large. That is, as indicated by a reference numeral 631, the terminal may receive signals from the serving DU and the target DU without much difference in the SNR values thereof. That is, it can be seen that the SNR value from the target DU is quite high even though the distance between the vehicle terminal and the target DU is quite far. More specifically, the difference of the SNR value from the target DU using the same frequency band may be very small in the remaining regions except when the vehicle terminal is sufficiently close to the serving DU.

The above phenomenon may be caused when the frequency reuse factor is set to 1 as described in FIG. 5. As such, when the SNR from the target DU is high, the signal received from the target DU acts as an interference signal when the vehicle terminal receives signals. In addition, as illustrated in FIG. 6, since the SNR value of the signal from the target DU, which is an interference signal, does not differ significantly from the SNR value of the signal from the serving DU, it means that communication performance may be greatly affected.

The present disclosure provides a method and an apparatus for solving the above-described interference problem. In addition, the present disclosure proposes a method and an apparatus for improving a data rate by allocating an additional band within a time period allowed by an adjacent DU. In addition, the present disclosure proposes a method and an apparatus for allowing a terminal capable of using only one partial band at a time to smoothly perform adjacent cell search.

Figure 7:
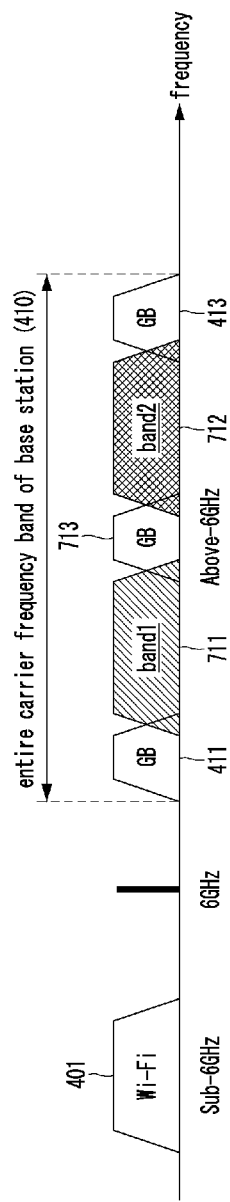
FIG. 7 is an exemplary diagram for describing frequency bands allocable by a DU according to an exemplary embodiment of the present disclosure.

FIG. 7 is an exemplary diagram for describing frequency bands allocable by a DU according to an exemplary embodiment of the present disclosure.

In FIG. 7, the same reference numerals are used for the same parts as those of the configuration of FIG. 4 described above. That is, the Wi-Fi band 401 of 6 GHz or below and the frequency band 410 of 6 GHz or above used for communication between the vehicle terminal mounted on (or attached to) the vehicle and the DU are illustrated.

The entire carrier frequency band 410 of the base station that can be used by the DU may be used as being divided according to the present disclosure. In the following description, when a CU is not specifically mentioned in relation to scheduling in the present disclosure, a base station may be understood as the DU, TRP, or RU described above. Therefore, the entire carrier frequency band 410 of the base station that can be used by the base station for communication may be the entire carrier frequency band that can be used by the DU or the entire carrier frequency band that can be used by the TRP or RU, depending on a case.

The entire carrier frequency band of the base station may be configured as follows according to the present disclosure. The entire carrier frequency band 410 of the base station may be composed of the band 0 (i.e., BWP0) 412 that can be used for communication, the GB 411 from the lowest frequency of the band 0 to a frequency higher by a certain value than the lowest frequency, and the GB 413 from the highest frequency of the band 0 to a frequency lower by a certain value than the highest frequency, which are the same as described in FIG. 4.

According to an exemplary embodiment of the present disclosure, the entire carrier frequency band 410 of the base station may be divided into two bands 711 and 712 (hereinafter, 'band1' and 'band2'). The band1 and the band2 may be configured so that frequencies thereof do not overlap with each other. That is, the band1 may be configured as a predetermined frequency region from the highest frequency of the GB 411 to a frequency higher by a certain value than the highest frequency. In order not to prevent overlapping between the band1 and the band2, a GB 713 may be disposed from the highest frequency from the band1. In addition, the band2 may be configured as a predetermined frequency region from the highest frequency of the GB 713 to a frequency before the GB 413 located in the highest frequency region of the entire carrier frequency band 410 of the base station. In the following description, in order to facilitate identification of the GBs 411, 413, and 713, the GB 411 located in the lowest frequency band among the GBs 411, 413, and 713 will be referred to as a first GB, the GB 713 located in the middle will be referred to as a second GB, and the GB 413 located in the highest frequency band will be referred to as a third GB.

Therefore, the band1 may be a frequency resource between the first GB 411 and the second GB 713, and the band2 may be a frequency resource between the second GB 713 and the third GB 413. It may be preferable to configure the band1 and the band2 to basically have the same size. However, the present disclosure does not limit a case of configuring the band1 and the band2 to have asymmetric sizes.

The above-described scheme of dividing the entire carrier frequency band 410 of the base station into two bands may correspond to a case of using a frequency reuse factor of 2. In the following description, such the scheme will be described as a 'frequency division scheme'. On the other hand, although the present disclosure exemplifies a form in which the frequency reuse factor is set to 2 in FIG. 7, the frequency reuse factor may be set to a value of 3 or more when necessary.

Hereinafter, a frequency division based interference mitigation method according to the present disclosure will be described.

Figure 8A:
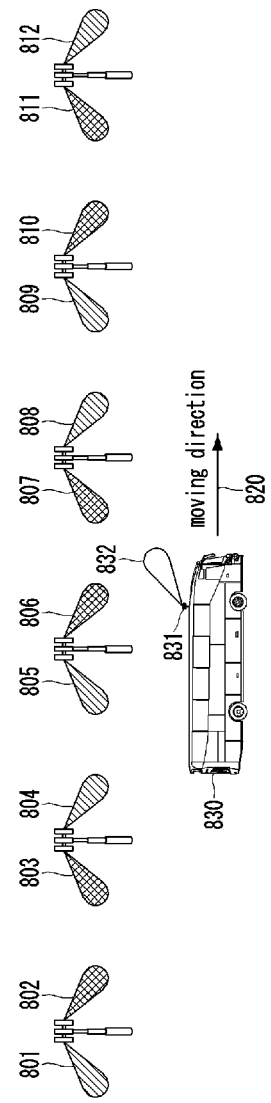
FIG. 8A is an exemplary diagram for describing frequency allocation by a DU based on a frequency division-based interference mitigation scheme according to the present disclosure.

FIG. 8A is an exemplary diagram for describing frequency allocation by a DU based on a frequency division-based interference mitigation scheme according to the present disclosure.

Comparing FIG. 8A with FIG. 3 described above, only configuration for describing communication between the base station and the vehicle terminal in the entire network is exemplified.

Referring to FIG. 8A, only DUs 801, 802, 803, 804, 805, 806, 807, 808, 809, 810, 811, and 812, a vehicle 830, and a vehicle terminal 831 are exemplified. In addition, the vehicle terminal 831 may perform reception beamforming 832, and as described above, a direction of the beamforming 832 may be based on a moving direction 820 of the vehicle. In addition, since the vehicle 830 moves along a road, the moving direction 820 of the vehicle terminal may be a direction based on the road. In FIG. 8A, a case of a straight road is assumed.

The DUs 801, 802, 803, 804, 805, 806, 807, 808, 809, 810, 811, and 812 will be respectively described, for convenience of description, as a first DU 801, second DU 802, third DU 803, . . . , and twelfth DU 812. In addition, each of the DUs 801, 802, 803, 804, 805, 806, 807, 808, 809, 810, 811, and 812 may be replaced with a TRP or RU as described in FIG. 5 or may include a TRP or RU.

The first DU 801 and the second DU 802 may be installed at the same location and may be implemented as independent cells that perform beamforming in different directions with respect to the road. Each pair of two DUs among other DUs 803, 804, 805, 806, 807, 808, 809, 810, 811, and 812 may be arranged in the same form as the first DU 801 and the second DU 802, and may be implemented as independent cells that perform beamforming in different directions with respect to the road.

In addition, various modifications of the form in which the DUs are actually implemented have been described in FIG. 5. The various modifications described with reference to FIG. 5 may also be applied to the DUs illustrated in FIG. 8A as they are. Hereinafter, allocation of a frequency band by each DU according to a frequency division based interference mitigation method of the present disclosure will be described.

Referring to FIG. 8A, the first DU 801 and the second DU 802 may communicate using different bands. That is, the first DU 801 may communicate with the vehicle terminal using the band1 described in FIG. 7, and the second DU 802 may communicate with the vehicle terminal 831 using the band2 described in FIG. 7. In addition, the third DU 803 may communicate with the vehicle terminal using the band2 described in FIG. 7, and the fourth DU 804 may communicate with the vehicle terminal using the band1 described in FIG. 7.

In the above-described manner, the DUs 801, 804, 805, 808, 809, and 812 using the band1 and the DUs 802, 803, 806, 807, 810 and 811 using the band2 may be separated as illustrated in FIG. 8A. As described above, the allocation of the band1 and the band2 to the DUs 801, 802, 803, 804, 805, 806, 807, 808, 809, 810, 811, and 812 is to reduce interference, and may correspond to a case of using a frequency reuse factor of 2. That is, it may be a frequency division-based interference mitigation method according to the present disclosure.

The resource allocation method according to the frequency division based interference mitigation method illustrated in FIG. 8A may be described as follows.

The odd-numbered DUs 801, 803, 805, 807, 809, and 811 may allocate resources of different bands to adjacent DUs among the odd-numbered DUs. For example, the first DU 801 and the third DU 803 may be adjacent DUs among the odd-numbered DUs. In the same manner, the third DU 803 and the fifth DU 805 may be adjacent DUs among the odd-numbered DUs, the fifth DU 805 and the seventh DU 807 may be adjacent DUs among the odd-numbered DUs, the seventh DU 807 and the ninth DU 809 may be adjacent DUs among the odd-numbered DUs, and the ninth DU 809 and the eleventh DU 811 may be adjacent DUs between the odd-numbered DUs.

Therefore, different bands are allocated between the adjacent DUs among the odd-numbered DUs. Specifically, when the band1 is allocated to the first DU 801, the band2 may be allocated to the third DU 803 that is an adjacent DU among the odd-numbered DUs. Conversely, when the band2 is allocated to the first DU 801, the band1 may be allocated to the third DU 803 that is an adjacent DU among the odd-numbered DUs. As such, different bands may be allocated to adjacent DUs among the odd-numbered DUs.

Next, the even-numbered DU installed in the same location as the odd-numbered DU may be allocated a different frequency band from the odd-numbered DU located in the same location. Specifically, when the band1 is allocated to the first DU 801, the band2 may be allocated to the second DU 802 that is the even-numbered DU installed at the same location. Conversely, when the band2 is allocated to the first DU 801, the band1 may be allocated to the second DU 802, which is the even-numbered DU installed at the same location.

Although the above description has been made by taking the odd-numbered DUs as examples, the same manner may be applied even when the frequency bands are allocated based on the even-numbered DUs. That is, different frequency bands may be allocated between adjacent DUs among the even-numbered DUs. In addition, different frequency bands may be allocated to the odd-numbered DU in the same location as the even-numbered DU.

When the radio frequency bands used by the DUs are arranged as described above, a distance between DUs using the same frequency band is considerably increased. In the case of FIG. 5, a serving DU of the vehicle terminal 511 may be the fifth DU 505. A DU that uses the same frequency band as the serving DU (i.e., fifth DU 505), and performs beamforming corresponding to a beamforming direction of the vehicle terminal 511 may be the seventh DU 507. That is, a DU substantially adjacent to the fifth DU 505 may be the seventh DU 507. If the road is straight and a unit distance between the DUs is 1000 meters, signals transmitted by the seventh DU 507 using the same frequency band as the fifth DU 505 which is the serving DU communicating with the vehicle terminal 511 may be received with very high SNR as described with reference to FIG. 6. Accordingly, it acts as a very large interference to the communication of the vehicle terminal 511.

The case of allocating frequency bands used by the DUs according to the frequency division based interference mitigation method of the present disclosure illustrated in FIG. 8A will be compared with the case of FIG. 5.

In FIG. 8A, the serving DU of the vehicle terminal 831 may be the seventh DU 807, and the seventh DU 802 may use the band1 and perform beamforming in the direction of the vehicle terminal 831. In addition, the vehicle terminal 831 may perform beamforming 832 in the moving direction 820. In this case, with reference to FIG. 5, an adjacent DU using the same frequency band may be the ninth DU 809. However, when frequency resources are allocated according to the frequency division based interference mitigation method according to the present disclosure, an adjacent DU using the same frequency band as the seventh DU 807 serving as the serving DU of the vehicle terminal 831 may become the eleventh DU 811. As described above, when the road is straight and a unit distance between the DUs is 1000 meters, the distance between the seventh DU 807 and the eleventh DU 811 may be 2000 meters. Since an interference signal of the frequency band is received from a distance much far than the distance described in FIG. 6, the interference can be significantly mitigated.

That is, in the example of FIG. 5, there are DUs performing beamforming using the same frequency band in the same direction at each location where the DUs of the base station are arranged. On the other hand, according to the present disclosure, DU performing beamforming using the same frequency band in the same direction may be arranged in a scheme of skipping one location among DU arrangement locations according to the frequency reuse factor of 2. That is, the distance between the DUs performing beamforming using the same resource in the same direction may be increased. In general, since a strength of a signal received from a base station is inversely proportional to a square of a distance, increasing the distance may mean having an effect of mitigating interference.

In addition, the sixth DU 806 and the seventh DU 807 use the same frequency band. However, it has been described that the vehicle terminal 831 performs the reception beamforming 832 in the moving direction 820. Therefore, since signals received from the sixth DU 806 are received at a backlobe of the vehicle terminal 831, there is little interference effect. As a result, when using the DU arrangement and resource allocation method according to the present disclosure, it is possible to reduce the interference on the vehicle terminal.

Meanwhile, such the resource allocation may be performed in the CUs 320 and 330 described with reference to FIG. 3. If negotiation for the resource allocation is required between the CUs 320 and 330, a negotiation procedure for frequency resource allocation may be performed through an interface between the base stations. As another example, an operator of the wireless communication network may configure frequency resource information to be used in each DU based on information on deployments of the CUs 320 and 330 and the DUs.

Figure 8B:
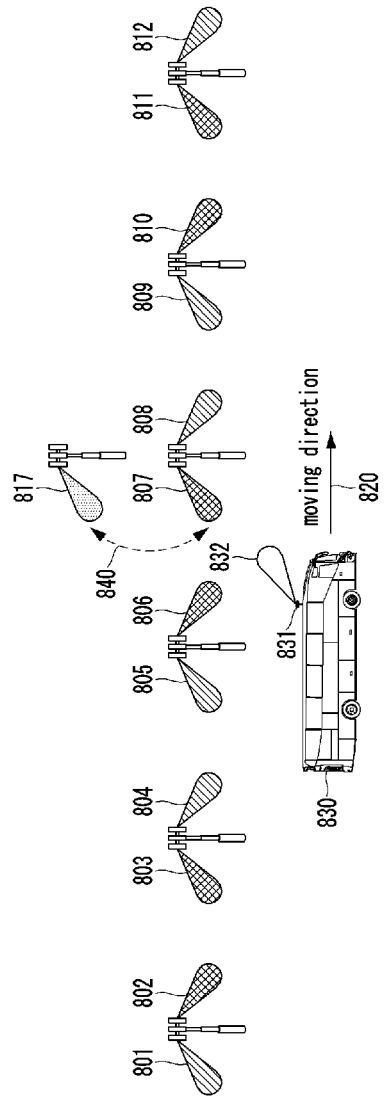
FIG. 8B is an exemplary diagram for describing allocation of an additional band according to another exemplary embodiment of the present disclosure.

FIG. 8B is an exemplary diagram for describing allocation of an additional band according to another exemplary embodiment of the present disclosure.

FIG. 8B illustrates a case of allocating frequency bands to DUs in the same manner as described with reference to FIG. 8A, and illustrates the same configuration. That is, referring to FIG. 8B, the DUs 801, 802, 803, 804, 805, 806, 807, 808, 809, 810, 811, and 812, the public transportation vehicle 830, and the vehicle terminal 831 are illustrated. In this example, the beamforming direction 832 of the vehicle terminal 831 and the moving direction 820 of the vehicle terminal 831 are illustrated together. However, FIG. 8B illustrates a case in which the seventh DU 807 serving as a serving DU of the vehicle terminal 831 is switched into a DU 817 to which the entire band0 is allocated.

In an environment such as a highway where vehicle traffic is rare, there may be a case where a terminal does not exist within a coverage of an adjacent DU. In this case, since the adjacent DU does not transmit signals, the serving cell may use a frequency band allocated to the adjacent DU. For this purpose, a DU without a terminal being served may periodically provide information on a frequency resource it uses or information on a frequency resource it does not use to adjacent DUs through a wired or wireless backhaul link. Such the information may be transmitted through a specific message, and will be referred to as a 'resource use permission message' in the following description. The resource use permission message may include at least one of a frequency resource use permission indication for a specific frequency resource, a start time at which the corresponding frequency resource is available, information on available slot(s) (i.e., available time period) based on the start time, or a combination thereof. The serving DU may receive the resource use permission messages from each of two DUs adjacent thereto, and if there is an intersection between the frequency resources permitted to be used by the two DUs and the time periods allowed for use, the serving DU may allow the resources of the adjacent two DUs only within the corresponding time period as an additional band.

For example, the DU serving the vehicle terminal 831 may be the seventh DU 807, and the DUs adjacent to the seventh DU 807 may be the fifth DU 805 and the ninth DU 809. This is because the two DUs perform beamforming in the same direction as the seventh DU. In addition, the physically-adjacent sixth DU 806 and eighth DU 808 may not be adjacent DUs because their beamforming directions are opposite to the beamforming direction of the serving DU. When the seventh DU 807 communicates with the vehicle terminal 831 through the band2, both the adjacent DUs 805 and 809 use the band1. In this case, when the fifth DU 805 and the ninth DU 809 using the band1 transmit the resource use permission messages that permit the use of the entire band1 for a predetermined time, the seventh DU 807 may communicate with the vehicle terminal 831 through the entire band0.

As another example, when each of the fifth DU 805 and the ninth DU 809 using the band1 transmits a resource use permission messages that permits use of a part of the band1 for a predetermined time, the seventh DU 807 may additionally use resources corresponding to an intersection of the band2 allocated to itself and the bands permitted by the fifth DU 805 and the ninth DU 809 to communicate with vehicle terminal 831.

That is, as illustrated in FIG. 8B, the seventh DU 807 may operate like a new seventh DU 817 that is allocated additional frequency resources from a state of being allocated the band1. A reference numeral 840 illustrates a form in which a frequency resource of a specific DU is allocated and then restored again.

Figure 8C:
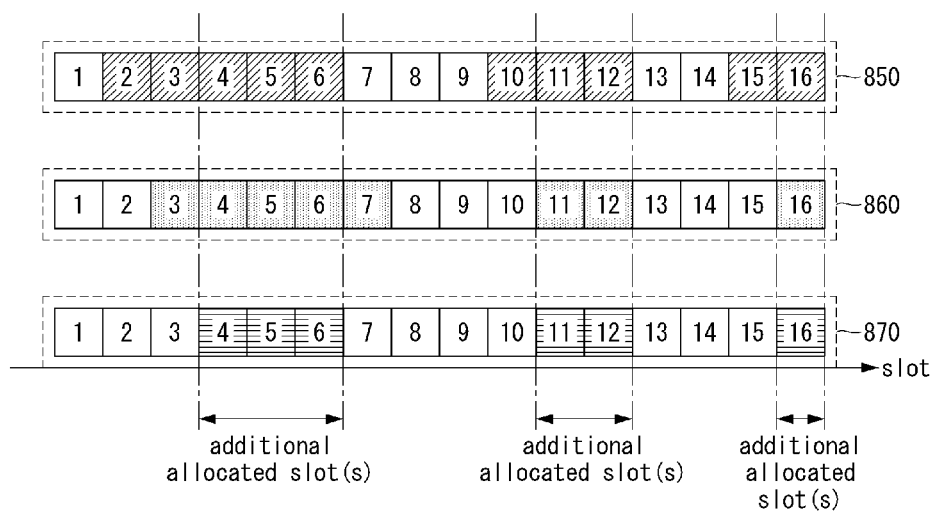
FIG. 8C is an exemplary diagram for describing an operation of determining additional slot(s) by using resource use permission messages received from adjacent base stations according to the present disclosure.

FIG. 8C is an exemplary diagram for describing an operation of determining additional slot(s) by using resource use permission messages received from adjacent base stations according to the present disclosure.

Before referring to FIG. 8C, as described with reference to FIG. 8B, it is assumed that a serving DU of the vehicle terminal 831 is the seventh DU 807. The seventh DU 807 that is the serving DU of the vehicle terminal 831 may receive a resource use permission message from the fifth DU 805 that is an adjacent DU.

A reference numeral 850 illustrates permitted slots received from the fifth DU 805. The resource use permission message transmitted from the fifth DU 805 to the seventh DU 807 may include a frequency resource use permission indication for a specific frequency resource, a start time at which the corresponding frequency resource is available, and information on available slot(s) based on the start time. More specifically, the frequency resource use permission indication may indicate whether use of the specific frequency resource (or frequency band) is permitted. If the use of the specific frequency resource is permitted, information on the start time when the corresponding frequency resource can be used may be identified using the information on the start time. In addition, actually-available slots may be identified using the information on available slot(s) based on the start time. Accordingly, the specific frequency resource based on the frequency resource use permission indication may be indicated up to a time point indicated by slot information or as many as a predetermined number of slots.

In FIG. 8C, there may be a case in which it is determined whether a specific frequency resource is permitted to be used in units of 16 slots. It may also correspond to a case where slots 850 permitted by the fifth DU 805 to the seventh DU 807 serving as the serving DU of the vehicle terminal 831 are slots 2, 3, 4, 5, 6, 10, 11, 12, 15, and 16.

Next, the resource use permission message received by the seventh DU 807 from the ninth DU 809 may also include a frequency resource use permission indication, information on a start time, and information on available slot(s) based on the start time. Accordingly, in the same manner, the slots 860 permitted by the ninth DU 809 to the seventh DU 807 that is the serving DU of the vehicle terminal 8310 for a specific frequency resource may be slots 3, 4, 5, 6, 7, 11, 12, and 16.

According to an exemplary embodiment of the present disclosure, the seventh DU 807 may allocate the slots 3, 4, 5, 6, 11, 12, and 16, which are an intersection between the permitted slots received from the fifth DU 805 and the permitted slots received from the ninth DU 809, as additional allocable resources.

According to another exemplary embodiment of the present disclosure, the seventh DU 807 may additionally consider slots 870 available in the seventh DU 807 that is the serving DU, in addition to the permitted slots received from the fifth DU 805 and the permitted slots received from the ninth DU 809. That is, the intersection (hereinafter referred to as a first intersection) of slots permitted from the adjacent base stations and the intersection of the slots 870 available in the seventh DU 807 (hereinafter referred to as a second intersection) may be additionally allocated from the band1 actually used by the adjacent base stations.

The first intersection may be the slots 3, 4, 5, 6, 11, 12, and 16. In addition, the second intersection may be the slots 4, 5, 6, 11, 12, and 16, when the slots 870 available in the seventh DU 807, which is the serving DU, are configured as the slots 4, 5, 6, 11, 12, and 16.

The slots 870 available in the seventh DU 807, which is the serving DU, may be slots configured based on the DU's own reason. For example, when a power transmitted in a specific slot of a default band is greater than or equal to a certain value, the same slot as the corresponding slot may be excluded from the available slots. As another example, in the case of a slot in which a reference signal of an additional band to be described below is transmitted, the corresponding slot may be excluded from the available slots. In addition, the serving DU 807 may determine the available slots 870 for various reasons.

In the example described with reference to FIG. 8C, the case in which frequency resource permission indication is made in units of 16 slots from adjacent base stations has been described. However, in actual implementation, 17 or more slots may be permitted by one frequency use permission message, or 15 or less slots may be permitted by one frequency use permission message.

On the other hand, when the frequency division-based interference mitigation method according to the present disclosure is used, a handover of the vehicle terminal may occur. According to the present disclosure, in the handover situation of the vehicle terminal, the frequency band used by the serving DU and the frequency band used by the target DU are different from each other. When the frequency bands used by the serving DU and the target DU are different and they have different synchronizations, it may take a long time for the vehicle terminal to acquire synchronization of the target DU during the handover. As such, when it takes a long time to acquire synchronization with the target DU, the vehicle terminal may experience a service interruption. In addition, the service interruption of the vehicle terminal may result in service interruption of all user devices within the vehicle, and consequently, a problem in which service quality is deteriorated may occur. Therefore, there is a need for a method of searching for adjacent cells when a handover is performed in the frequency division-based interference mitigation method.

In addition, depending on the performance of vehicle terminals, there may be a vehicle terminal capable of receiving the entire carrier frequency band 410 of the DU at a time and a vehicle terminal not capable of receiving the entire carrier frequency band 410 of the DU at a time. For example, a vehicle terminal capable of receiving only one specific band (e.g., only the band1 or the band2) at a time may exist. When such the vehicle terminal does not acquire synchronization in advance by searching for an adjacent cell, a smooth handover may not be performed and the service may be interrupted. Therefore, in order to solve this problem, the present disclosure proposes the following two operation methods.

[Operation Method 1]

In the operation method 1 according to the present disclosure, the DU may always transmit a synchronization signal in its own default band and use a method of allocating a synchronization signal to an additional band (e.g., communication frequency band of adjacent base stations) to search for adjacent cells. This will be described with reference to FIGS. 9A and 9B.

Figure 9A:
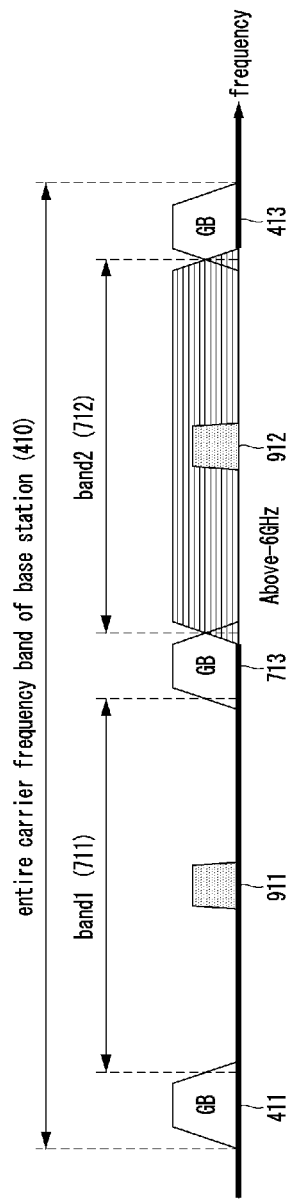
FIG. 9A is an exemplary diagram for describing transmission of an additional synchronization signal for supporting adjacent cell search in a DU using a band 2.
Figure 9B:
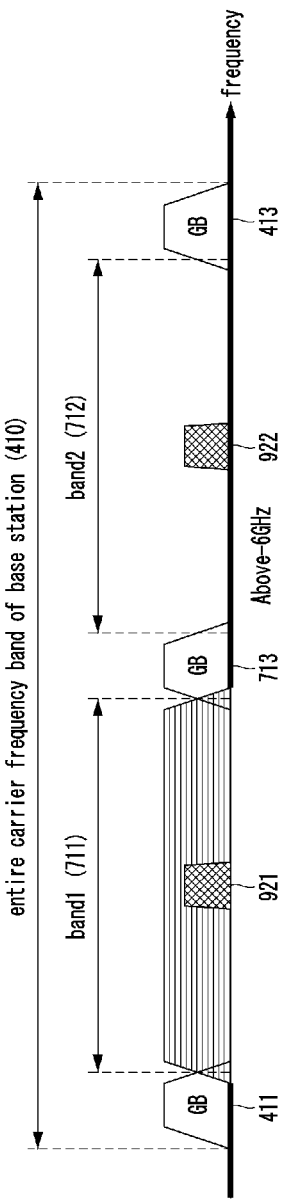
FIG. 9B is an exemplary diagram for describing transmission of an additional synchronization signal for supporting adjacent cell search in a DU using a band 1.

FIG. 9A is an exemplary diagram for describing transmission of an additional synchronization signal for supporting adjacent cell search in a DU using a band 2, and FIG. 9B is an exemplary diagram for describing transmission of an additional synchronization signal for supporting adjacent cell search in a DU using a band 1.

FIGS. 9A and 9B are diagrams illustrating in more detail only the entire carrier frequency band 410 of the base station among the frequency bands of FIGS. 4 and 7 described above. Here, the base station may be a DU, RU, or TRP as described above. In addition, in assigning reference numerals in FIGS. 9A and 9B, the same reference numerals as in FIG. 4 are used for the bands illustrated in FIG. 4, and the same reference numerals as in FIG. 7 are used for the bands illustrated in FIG. 7.

Before referring to FIG. 9A, a 'default band' and an 'additional band' will be defined and described. In the following description, a default band may be a band in which a specific DU communicates with the vehicle terminal. For example, when the band1 is allocated to a DU to communicate with the vehicle terminal, the band1 is referred to as a default band. In addition, the band2, which is a band other than the band1, may be an additional band for the DU to communicate with the vehicle terminal. As shown in FIG. 7, when a frequency reuse factor is not set to 2 and the frequency reuse factor is 3 or more, the additional band may be a wider band than the default band.

Next, a 'default band synchronization signal' and 'additional band synchronization signal' will be defined. The default band synchronization signal is a synchronization signal transmitted in the default band of the corresponding DU, and is a signal transmitted by the DU to synchronize with a vehicle terminal that communicates or initially accesses within its own coverage. The additional band synchronization signal is a synchronization signal transmitted in the additional band, and is a synchronization signal transmitted in the additional band so that the it can be used for searching for handover in coverages of other adjacent DUs other than its own coverage.

FIG. 9A will be described with reference to FIG. 8A. The serving DU of the vehicle terminal 831 is the seventh DU 807, and may communicate using the second band2. The seventh DU 807 may synchronize with the vehicle terminal 831 by transmitting a default band synchronization signal 912 using some resources (time and frequency resources) of the default band2. In addition, the seventh DU 807 may communicate with the vehicle terminal 831 through the default band2 after acquiring synchronization with the vehicle terminal 831.

The seventh DU 807 according to the present disclosure may transmit an additional band synchronization signal through the band1 that is the additional band (i.e., communication band of the fifth DU 805 and the ninth DU 809, which are adjacent DUs). The additional band synchronization signal is a synchronization signal for allowing a vehicle terminal communicating with the fifth DU 805, which is an adjacent DU, to search for the seventh DU 807 during handover. Accordingly, the seventh DU 807 transmits only the additional band synchronization signal 911, and does not transmit data in the additional band1.

As described above, when the seventh DU 807 transmits the default band synchronization signal 912 through the base band2, and transmits the additional band synchronization signal through the additional band1, the operation of the vehicle terminals will be described.

The vehicle terminal 831 having the seventh DU 807 as the serving DU may receive the synchronization signal of the band2 used for communication from the seventh DU 807, and communicate with the seventh DU 807 after acquiring synchronization. Also, as illustrated in FIG. 9A, the seventh DU 807 may transmit the additional band synchronization signal 911 through the additional band1. In this case, the adjacent DUs using the additional band1 may be the fifth DU 805 and the ninth DU 809. Here, a terminal to be handed over to the seventh DU 807 may be a terminal communicating with the fifth DU 805. This is because it is assumed that the DUs according to the present disclosure are arranged along the road 340 as described with reference to FIG. 3, and it is assumed that the vehicles moving along the road 340 move in only one direction. Accordingly, the additional band synchronization signal 911 transmitted in the band1, which is the additional band of the seventh DU 807, may be a synchronization signal used for the vehicle terminal having the fifth DU 805 as their serving DU to synchronize with the seventh DU 807 during handover.

When the vehicle terminal having the fifth DU 805 as a serving DU performs handover to the seventh DU 807, the vehicle terminal may acquire synchronization with the seventh DU 807 by using the additional band synchronization signal 911 transmitted by the seventh DU 807 through the additional band. Thereafter, the vehicle terminal may perform handover to the seventh DU 807 through the handover procedure.

FIG. 9B illustrates an operation in the ninth DU 809. That is, the ninth DU 809 may communicate with vehicle terminals located within the coverage of the ninth DU 809 through the band1 that is a default band. In the ninth DU 809, the band2, which is the communication band of the seventh DU 807, may be an additional band, and the ninth DU 809 may transmit an additional band synchronization signal 922 in the additional band. Through this, when the vehicle terminal 831 communicating with the seventh DU 807 intends to handover to the ninth DU 809, may acquire synchronization with the ninth DU 809 using the additional band synchronization signal 922 transmitted by the ninth DU 809 in the additional band2. Accordingly, the vehicle terminal 831 may perform handover to the band1, which is the default band of the ninth DU 809, based on the synchronization acquired at the time of handover from the seventh DU 807 to the ninth DU 809.

The operation method 1 described above with reference to FIGS. 9A and 9B has the advantage of very simple implementation. However, since the synchronization signals of the adjacent cells measured by the vehicle terminal 831 are not received from the default band of the adjacent cells, the quality of the radio channel cannot be accurately measured.

[Operation Method 2]

As an operation method 2 of the present disclosure, a method for determining a time point at which a vehicle terminal should perform a handover preparation procedure in a serving DU communicating with the vehicle terminal and an operation before completing handover to a target DU will be described.

When the vehicle terminal passes a location where the communicating serving DU is installed, as described above with reference to FIG. 6, the signal strength may rapidly decrease to reach a state in which it cannot communicate with the serving DU. Therefore, when the serving DU communicating with the vehicle terminal operates as in a general handover procedure, the vehicle terminal may experience a situation in which communication is interrupted. Accordingly, since the vehicle terminal should go through a procedure of re-establishing connection to the target DU, it may take a long time for the communication to be re-established. In addition, since the service is also interrupted for all user devices within the vehicle due to the service interruption, a problem of deterioration of service quality may occur.

In the present disclosure, the handover preparation procedure may be performed based on the distance between the serving DU and the vehicle terminal communicating with the serving DU. Various method for measuring the distance between the vehicle terminal and the serving DU may exist. For example, the serving DU may use a timing advance (TA) value to measure the distance to the vehicle terminal. As another example, when the vehicle terminal includes a GPS receiver, the serving DU may calculate the distance to the vehicle terminal by requesting location information of the vehicle terminal and receiving a location message including the location information of the vehicle terminal. In this case, the DU may have information on a location in which itself is installed. Based on this, the distance to the vehicle terminal may be calculated using a difference between the received location of the vehicle terminal and its own location.

As described in FIG. 6, since the vehicle terminal and the serving DU respectively perform beamforming in specific directions, the SNR value rapidly decreases from a moment the vehicle terminal passes the serving DU. Therefore, the serving DU may need to configure a trigger condition differently from that of the general handover preparation procedure. The serving DU according to the present disclosure may configure a condition for performing the handover preparation procedure when the distance to the vehicle terminal is within a predetermined value, that is, when the distance between the vehicle terminal and the serving DU is within a predetermined distance. Therefore, when the handover preparation procedure is performed, the vehicle terminal may have a very high signal strength received from the serving DU.

A condition that the distance between the serving DU and the vehicle terminal is within 100 meters may be assumed as the condition for performing the handover preparation procedure. In the example of FIG. 6, the vehicle terminal may be in a state in which the vehicle terminal moves from the location 0 on the horizontal axis to the location 611 of the serving DU. As described above, it can be seen that when the vehicle terminal moves, the SNR value from the serving DU gradually increases. When the vehicle terminal passes a point of 500 meters and reaches a point of 100 meters from the location 611 in FIG. 6, the SNR value from the serving DU may further increase. However, since the signal strength rapidly decreases from the moment the vehicle terminal passes the serving DU, the serving DU may need to instruct the vehicle terminal to prepare for a handover procedure when the vehicle terminal enters within 100 meters of the serving DU.

The serving DU may transmit a predetermined control message to the vehicle terminal that satisfies the condition for performing the handover preparation procedure according to the present disclosure, so that the vehicle terminal can communicate with the adjacent base station by using the same band from a promised time point. That is, the serving DU may instruct the vehicle terminal to change the current communication band to the additional band. In this case, since the serving DU communicates with the vehicle terminal in the additional band, data transmitted to the vehicle terminal may be transmitted in the default band of another adjacent DU. This may act as interference to vehicle terminals communicating with the adjacent DU. Therefore, when the serving DU communicates with the vehicle terminal in the additional band for handover, the serving DU and the vehicle terminal may communicate with a lower power than a default transmission power. Here, the default transmission power may be a specific power value to which power control is not performed. For example, the specific power value may be a preset power value for transmitting signals to the vehicle terminal in the default band.

This case will be described with reference to FIGS. 8B and 9A described above.

It is assumed that the vehicle terminal 831 mounted on (or attached to) the vehicle 830 communicates with the seventh DU 807. As the vehicle 830 moves in the moving direction 820 and the vehicle terminal 831 approaches the seventh DU 807, the SNR may increase. However, when the vehicle terminal 831 approaches within a predetermined area of the seventh DU 807, the vehicle terminal 831 may satisfy a handover condition. That is, the vehicle terminal may be in a state in which handover should be performed despite the increased SNR. The seventh DU 807 may measure the distance to the vehicle terminal 831 continuously or periodically to check whether the vehicle terminal 831 enters within a predetermined distance. As a method of measuring the distance between the vehicle terminal 831 and the seventh DU 807, one of the above-described method based a TA value or the above-described method of receiving location information by requesting the location information may be used.

When the vehicle terminal 831 enters a handover region, that is, within the predetermined distance from the seventh DU 807, the seventh DU 807 may transmit a predetermined control message to the vehicle terminal 831 so that the vehicle terminal 831 switches to the same band as the adjacent base station and communicates in the switched band. That is, the seventh DU 807 may transmit a control message to the vehicle terminal 831 so that the vehicle terminal 831 communicates in the band1 that is the additional band. Accordingly, the vehicle terminal 831 may communicate through the band1 that is the additional band of the seventh DU 807. In this case, the seventh DU 807 may transmit signals with a power lower than the default transmission power when communicating with the vehicle terminal 831 through the band1 that is the additional band.

In addition, the seventh DU 807 may use the resource use permission message described above with reference to FIG. 8C when communicating with the vehicle terminal 831 through the additional band1. Referring to FIG. 8C, communication may be performed using slots from the fifth DU 805 that may cause interference when communicating with the vehicle terminal 831 in an adjacent band. In this case, when the seventh DU 807 receives a frequency resource permission indication message from the ninth DU 809, which is another adjacent DU, as described in FIG. 8C, the seventh DU may communicate using at least one of slots corresponding to the first intersection or second intersection between permitted slots.

Accordingly, the vehicle terminal 831 may receive the synchronization signals of the adjacent DUs while communicating by switching from the default band to the additional band of the seventh DU 807 serving as the serving DU. From the perspective of the seventh DU 807 that is the serving DU, the seventh DU 807 may communicate with vehicle terminals located in its own cell that have not entered the handover region in the default band. On the other hand, the seventh DU 807 may communicate with vehicle terminal(s) entering the handover region in the additional band. Therefore, the seventh DU 807 may operate in a state in which both the default band and the additional band are activated. Accordingly, the seventh DU 807 may transmit the synchronization signal in the default band as well as in the additional band, and may perform data communication.

Unlike the operation method 1, the DU according to the operation method 2 described above may basically transmit a synchronization signal only in the default band, and may additionally allocate its own synchronization signal in the additional band only when a terminal performing adjacent cell search within the coverage (i.e., handover-preparing terminal) exists.

On the other hand, in both of the above-described methods (i.e., operation method 1 and operation method 2), a case in which a synchronization signal of the additional band other than the default band of the serving DU is first received at a terminal performing initial access may occur. Therefore, in the operation method 1, an initially-accessing terminal may receive the synchronization signal of the additional band, or in the operation method 2, an initially-accessing terminal that does not enter the handover preparation region may receive the synchronization signal of the additional band. In this case, it may be necessary for the corresponding terminal to perform initial access again in the default band.

In order to perform initial access in the default band, in the present disclosure, the synchronization signal itself may include information that allows the terminal to identify whether the received synchronization signal is a default band synchronization signal or an additional band synchronization signal.

According to an exemplary embodiment of the present disclosure, by configuring a synchronization signal sequence for the default band and a synchronization signal sequence for the additional band to be different from each other, the vehicle terminal can acquire the synchronization signal in the default band.

According to another exemplary embodiment of the present disclosure, information for identifying the default band or the additional band may be transmitted as being included in a physical broadcast channel (PBCH) transmitted in a synchronization signal block (SSB). The DU may allow the vehicle terminal to identify whether the current band is the default band or the additional band by setting and transmitting one bit for identifying the default band and the additional band in the PBCH transmitted as being included in the SSB.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A communication method of a base station, comprising:
configuring a first band as a communication band from an entire carrier frequency band of the base station, the entire carrier frequency band being configured with the first band and a second band;
transmitting, to a first direction among two directions of a moving path of a transportation means by beamforming, a synchronization signal in the first band;
communicating with a first terminal by beamforming in a same direction as the synchronization signal in the first band; and transmitting, to the first direction by beamforming, a synchronization signal in the second band to enable a second terminal communicating with a second base station to search for the base station,
wherein the second base station communicates with the second terminal using first direction beam by beamforming in the second band.

2. The communication method according to claim 1, further comprising:
when at least part of frequency resources of the communication band are not used for communication, generating a resource use permission message for notifying an adjacent base station; and
transmitting the resource use permission message to the adjacent base station.

3. The communication method according to claim 1, further comprising, when resource use permission messages for the second band are received from two or more adjacent base stations, communicating with the terminal using resources of the second band indicated by the resource use permission messages.

4. The communication method according to claim 3, wherein each of the resource use permission messages includes an indication for permitting use of a specific frequency resource for the second band, information indicating a start time at which the specific frequency resource is available, and information indicating available slot(s) based on the start time.

5. The communication method according to claim 3, wherein when communicating with the terminal using the resources of the second band, the base station uses only common resources among resources permitted by the resource use permission messages received from the adjacent base stations.

6. The communication method according to claim 1, further comprising:
obtaining information on a distance between the base station and each of terminals communicating in the first band;
transmitting a control message indicating to switch a communication band to the second band to a terminal located within a preset threshold distance from the base station; and
communicating with the terminal located within the preset threshold distance from the base station in the second band.

7. The communication method according to claim 6, wherein in the obtaining of the information on the distance, a timing advance (TA) value based on a signal received from each of the terminals is used.

8. The communication method according to claim 6, wherein the obtaining of the information on the distance comprises:
transmitting a first message requesting location information to each of the terminals;
receiving a second message including the location information from each of the terminals; and
calculating the distance using a location of the base station and the location information of each of the terminals.

9. The communication method according to claim 1, wherein the synchronization signal transmitted in the first band and the synchronization signal transmitted in the second band are configured as distinguishable signals from each other.

10. A base station comprising:
a processor; and
a transceiver for communicating with at least one terminal,
wherein the processor is executed to perform:
configuring a first band as a communication band from an entire carrier frequency band of the base station, the entire carrier frequency band being configured with the first band and a second band;
controlling the transceiver to transmit, to a first direction among two directions of a moving path of a transportation means by beamforming a synchronization signal in the first band;
controlling the transceiver to communicate with a first terminal by beamforming in a same direction as the synchronization signal in the first band; and
controlling the transceiver to transmit, to the first direction by beamforming, a synchronization signal in the second band to enable a second terminal communicating with a second base station to search for the base station,
wherein the second base station communicates with the second terminal using first direction beam by beamforming in the second band.

11. The base station according to claim 10, wherein the processor is further executed to perform:
when at least part of frequency resources of the communication band are not used for communication, generating a resource use permission message for notifying an adjacent base station; and
controlling the transceiver to transmit the resource use permission message to the adjacent base station.

12. The base station according to claim 11, wherein the processor is further executed to perform: when resource use permission messages for the second band are received from two or more adjacent base stations, controlling the transceiver to communicate with the terminal using resources of the second band indicated by the resource use permission messages.

13. The base station according to claim 12, wherein each of the resource use permission messages includes an indication for permitting use of a specific frequency resource for the second band, information indicating a start time at which the specific frequency resource is available, and information indicating available slot(s) based on the start time.

14. The base station according to claim 12, wherein the processor is further executed to perform: when communicating with the terminal using the resources of the second band, using only common resources among resources permitted by the resource use permission messages received from the adjacent base stations.

15. The base station according to claim 10, wherein the processor is further executed to perform:
obtaining information on a distance between the base station and each of terminals communicating in the first band;
controlling the transceiver to transmit a control message indicating to switch a communication band to the second band to a terminal located within a preset threshold distance from the base station; and
controlling the transceiver to communicate with the terminal located within the preset threshold distance from the base station in the second band.

16. The base station according to claim 15, wherein in the obtaining of the information on the distance, a timing advance (TA) value based on a signal received from each of the terminals is used.

17. The base station according to claim 15, wherein in the obtaining of the information on the distance, the processor is further executed to perform:
- controlling the transceiver to transmit a first message requesting location information to each of the terminals;
- controlling the transceiver to receive a second message including the location information from each of the terminals; and
- calculating the distance using a location of the base station and the location information of each of the terminals.

18. The base station according to claim 10, wherein the synchronization signal transmitted in the first band and the synchronization signal transmitted in the second band are configured as distinguishable signals from each other.

19. A communication method of a base station, comprising:
- determining a communication band to be used for communication based on a frequency division scheme, for each remote unit (RU) belonging to a plurality of RU pairs, wherein each of the RU pairs consists of two RUs, and each of the RU pairs is arranged along a moving path of a transportation means;
- beamforming, by odd-numbered RUs constituting each of the plurality of RU pairs, to communicate with a terminal located in a first direction on the moving path in the determined communication band; and
- beamforming, by even-numbered RUs constituting each of the plurality of RU pairs, to communicate with a terminal located in a second direction on the moving path in the determined communication band, the first direction is the opposite direction to the second direction on the moving path, wherein the frequency division scheme comprises:
- configuring a first band as a communication band from an entire carrier frequency band of the base station for a first odd-numbered RU among the odd-numbered RUs constituting the plurality of RU pairs, the entire carrier frequency band being configured with the first band and a second band;
- configuring one of the first band and the second band as a communication band for each RU so that adjacent RUs among the odd-numbered RUs have different communication bands; and
- configuring one of the first band and the second band as a communication band for each even-numbered RUs, wherein the communication band for an even-numbered RU within a RU pair is different from a communication band for an odd-numbered RU within the RU pair.

20. The communication method according to claim 19, wherein RUs forming each of the plurality of RU pairs are installed in a same geographical location.

* * * * *